United States Patent [19]
Szeverenyi

[11] 3,832,702
[45] Aug. 27, 1974

[54] LATCHING MEANS FOR SENSING APPARATUS

[75] Inventor: Nikolaus A. Szeverenyi, Warren, Pa.

[73] Assignee: GTE Sylvania Incorporated, Seneca Falls, N.Y.

[22] Filed: Sept. 12, 1973

[21] Appl. No.: 396,873

Related U.S. Application Data

[63] Continuation-in-part of Ser. No. 236,148, March 20, 1972.

[52] U.S. Cl............ 340/244 R, 307/311, 307/142, 337/13, 340/332
[51] Int. Cl. ........................................... G08b 21/00
[58] Field of Search ............................... 340/244 R

[56] References Cited
UNITED STATES PATENTS
3,786,463  1/1974  Peltz et al. .................. 340/244 R Primary Examiner—Thomas B. Habecker
Attorney, Agent, or Firm—Norman J. O'Malley; Donald R. Castle; William H. McNeill

[57] ABSTRACT

A latching means for providing a steady electrical signal from a sensor device to a current indicating means in a sensing apparatus. The latching means, which may be energized by heat, light, or electrical current, assures a steady signal upon the initial engagement of the heat responsive means within the sensor device.

8 Claims, 5 Drawing Figures

3,832,702
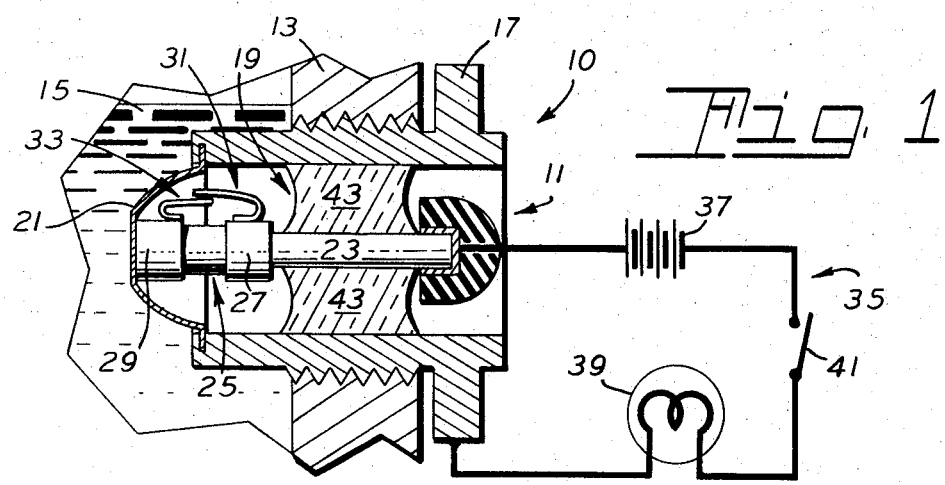
Fig. 1
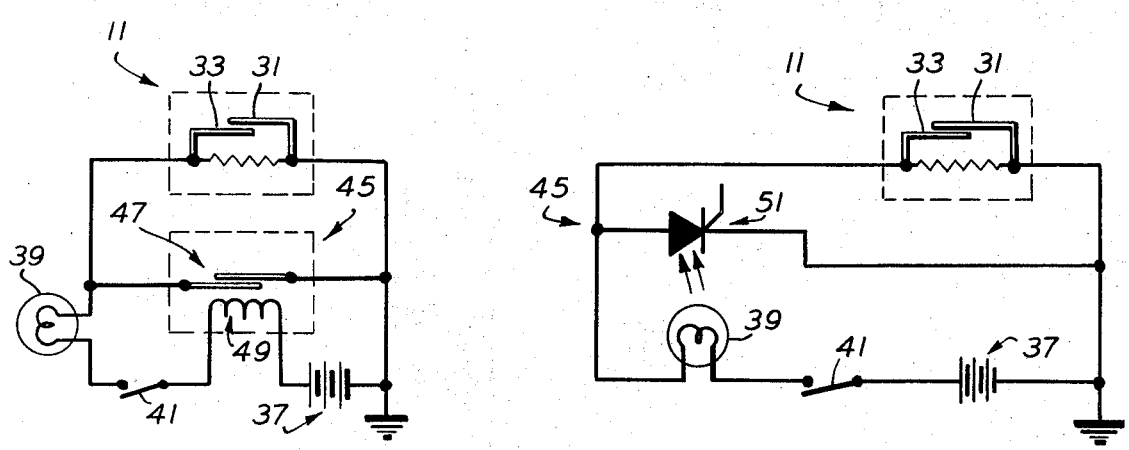
Fig. 2A
Fig. 3
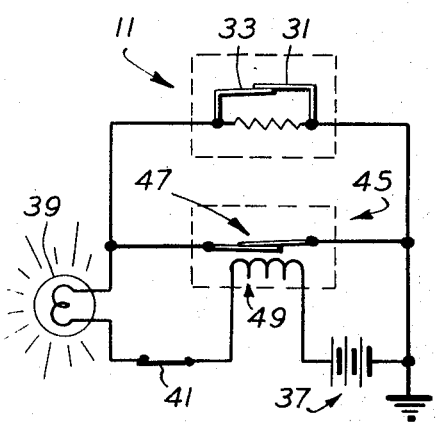
Fig. 2B
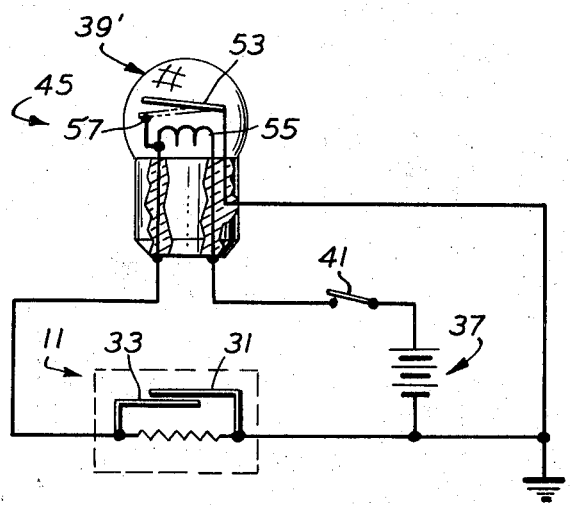
Fig. 4

LATCHING MEANS FOR SENSING APPARATUS

CROSS-REFERENCE TO CO-PENDING APPLICATIONS

The present application is a continuation-in-part of the copending application U.S. Ser. No. 236,148, titled "Temperature Compensated Fluid Level Sensor," filed Mar. 20, 1972, and assigned to the same assignee as the present application.

BACKGROUND OF THE INVENTION

This invention relates to fluid level sensing apparatus and more particularly to an apparatus for providing a signal indication when the fluid in the container is below a predetermined level.

The sensing apparatus disclosed in the above-described copending application comprises a sensing device and a means for sensing when the heat responsive means within the device are engaged. The sensor device comprises a housing member, a tip member secured to the housing, a heat conductive member, a heater means having first and second spaced apart portions, and the above-mentioned heat responsive means affixed respectively to said first and second spaced apart portions and each having a free end adapted for mutual engagement when the temperature difference between the first and second spaced apart portions exceeds a predetermined level. The means for sensing when the heat responsive means are engaged comprises an electrical circuit including a source of electrical potential operatively connected to the heat responsive means and a current indicating means for indicating electrical current in the circuit when the heat responsive means are engaged.

A unique feature of the sensing apparatus disclosed in Ser. No. 236,148 is its inherent ability to provide an intermittent signal upon detecting either the absence or presence of fluid about its tip member. To provide a steady indication of the fluid condition would require only minor mechanical alterations or additions to the sensor. Conversely, the present invention utilizes electrical components to provide a means whereby a steady signal is provided the current indicating means upon the initial engagement of the heat responsive means.

OBJECTS AND SUMMARY OF THE INVENTION

It is, therefore, a primary object of this invention to provide a latching means for a sensing apparatus which provides a steady electrical signal from the sensor device to the current indicating means of the sensing apparatus.

It is a further object of this invention to provide a latching means for the above sensing apparatus which operates in a relatively simple manner and is relatively inexpensive to manufacture.

The foregoing objects are achieved in one aspect of the invention by the provision of a latching means which provides a steady electrical signal from the sensor device to the current indicating means of the sensing apparatus. This latching means comprises a switching means which is adapted for closing upon the initial engagement of the free ends of the heat responsive means located within the sensor device. Once the switching means is closed, a continuously steady current flows through the described indicating means thus providing a steady signal.

BRIEF DESCRIPTION OF THE DRAWINGS

FIG. 1 is a view, partly in section, of the sensing apparatus as disclosed in Ser. No. 236,148;

FIG. 2A is a schematic view of one embodiment of the present invention;

FIG. 2B is a schematic view of the embodiment of FIG. 2A during energization of the latching means;

FIG. 3 is a schematic view of another embodiment of the present invention; and

FIG. 4 is a schematic view of still another embodiment of the present invention.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

In FIG. 1, there is illustrated a sensing apparatus 10 which comprises a sensor device 11 adapted for being positioned within a container 13 and for sensing the condition of a fluid 15 within the container. Sensor device 11 comprises a housing 17 which defines a chamber 19, an electrically conductive tip member 21 secured to housing 17 and forming a closure for chamber 19 to prevent entrance of fluid 15 therein, an electrical and heat conductive member 23 and an electrically resistive heater means 25. Heater means 25 has first and second spaced apart electrically conductive portions 27 and 29 thereon with first portion 27 in heat conductive relationship to conductive member 23 and second portion 29 in heat conductive relationship to tip 21.

First and second heat responsive means 31 and 33 are respectively positioned on first and second portions 27 and 29 and each have a free end adapted for mutual engagement when the temperature difference between the two portions exceeds a predetermined level.

Sensing apparatus 10 further comprises a means 35 for sensing when the above described heat responsive means 31 and 33 are engaged. Means 35 comprises an electrical circuit having a source of electrical potential 37 operatively connected to the heat responsive means and a current indicating means 39 for indicating electrical current in the circuit when the heat responsive means are engaged. Switch member 41 is optionally provided as a means for opening and closing the circuit.

In operation, electrical currrent from potential source 37 flows through sensor device 11 and thus through the resistive heater means 25. This current returns to indicating means 39 through tip 21 and housing 17. With fluid 15 about tip 21, the heat generated by heater means 25 is equally transmitted from portions 27 and 29 through conductive member 23 and tip 21, respectively. The heat from these members is further transmitted into electrically insulative and heat conductive material 43 and into fluid 15, respectively. When the fluid drops below tip 21, an imbalance in this heat dissipation results with second portion 29 becoming substantially warmer than first portion 27. Accordingly, heat responsive means 33 will upwardly deflect and engage responsive means 31 thus providing an electrical bypass to the resistive heater means 25. With the resistor thus removed from the circuit, an increased amount of electrical current passes through indicating means 39 and is now sufficient to energize means 39. To further facilitate operations of sensing apparatus 10, electrical and heat conductive member 23 has a greater heat transfer capability than tip 21.

As can be seen, indicating means 39 is only energized when heat responsive means 31 and 33 are mutually engaged. After a period of time, the resistive heater means substantially cools due to the lack of electrical current therethrough. This cooling in turn causes heat responsive means 31 and 33 to become disengaged and the electrical current through sensor device 11 must pass through the resistor once again. The above-described sequential operation will continue to occur as long as fluid 15 is not substantially in contact with the tip.

To provide a means whereby indicating means 39 will become substantially steadily energized after the initial engagement of heat responsive means 31 and 33, means for sensing 35 further includes a latching means for providing a steady signal from the sensor to the current indicating means. This latching means comprises a switching means 45 as illustrated in the schematic view in FIGS. 2A and 2B. Switching means 45, illustrated as a reed switch 47 which is electrically energized by coil 49, is positioned in the circuit in the manner indicated. Sensor 11, current indicating means 39, switch member 41, and potential source 37 are also schematically illustrated. In operation when heat responsive means 31 and 33 are disengaged, electrical current passes through the resistor of sensor 11 and is at a relatively low level in the circuit. This low level is insufficient to energize indicating means 39 and coil 49. Accordingly, no indication is given and reed switch 47 remains open. It is understood switch member 41 is closed during operation of the sensing apparatus.

In FIG. 2B, heat responsive means 31 and 33 are engaged, thus providing a bypass to the sensor's resistor. At this time, the current level in the circuit raises appreciably and is sufficient to energize indicating means 39 and coil 49. Consequently, reed switch 47 is electrically induced to the shown closed position. Should responsive means 31 and 33 disengage once again, indicating means 39 will still remain energized and provide a continuous indication. This occurs as a result of the sensor device 11 now being bypassed by switching means 45.

Another embodiment for switching means 45 is illustrated in FIG. 3 wherein a light-activated silicon controlled rectifier 51, hereinafter referred to as a LASCR, is utilized. LASCR 51 is positioned in the near proximity to indicating means 39 and is adapted for receiving light therefrom. As in FIG. 2A and 2B, source 37, switch member 41, and sensor 11 are positioned in the circuit. The operation of this particular embodiment is substantially similar to that of reed switch 47 with the exception that LASCR 51 is energized upon receiving a pre-established amount of light, whereas reed switch 47 was energized by the passage of electrical current through coil 49. In operation (switch member 41 closed,) when responsive means 31 and 33 are disengaged, again the electrical current passing through the circuit is insufficient to energize the indicating means. However, once heat responsive means 31 and 33 make contact and bypass the resistor, the electrical current reaches a level sufficient to energize indicating means 39 which in turn triggers LASCR 51. Current now flows through LASCR 51 and sensor 11 is bypassed in the circuit. Accordingly, should responsive means 31 and 33 disengage, indicating means 39 remains energized and continues to trigger the LASCR.

With particular reference to FIG. 4, there is illustrated yet another embodiment of switching means 45 which provides a steady indication upon the intial engagement of the heat responsive means in sensor 11. In this embodiment, switching means 45 comprises a heat responsive member 53 located in the manner indicated in current indicating means 39'. Switch member 41 and potential source 37 are also shown. In operation, when responsive means 31 and 33 are disengaged, the relatively low current flow through indicating means 39' fails to energize this means. However, once the responsive means make initial contact, indicating means 39' is activated. Accordingly, the heat generated by the filament 55 of the indicating means causes heat responsive member 53 to deflect and make contact with terminal 57 (this deflection illustrated in phantom.) As a result of this deflection, a means for bypassing sensor 11 is assured and a continuous relatively high amount of electrical current flows steadily through filament 55. In doing so, indicating means 39' remains continuously energized providing the required indication with heat responsive member 53 remaining in contact with terminal 57. The latter described operation results in sensor 11 being bypassed in the circuit regardless of the subsequent disengagement of heat responsive means 31 and 33. As can be seen, a steady indication is achieved.

Thus, there has been shown and described a means whereby a steady electrical signal is provided from the sensor device to the current indicating means in the described sensing apparatus. By utilizing the components as illustrated, or suitable substitutes therefor, it has also been shown that the above-described latching means can be produced inexpensively and is relatively simple in operation.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensing apparatus comprising:
a sensor device including a housing member defining a chamber, an electrically conductive tip member for being exposed to a fluid, said tip member secured to said housing and forming a closure for said chamber to prevent fluid entrance into said chamber, an electrical and heat conductive member within said chamber having a greater heat transfer capability than said tip member, an electrically resistive heater means within said chamber having first and second spaced apart electrically conductive portions, said first portion in heat conductive relationship to said electrical and heat conductive member, said second portion in heat conductive relationship to said electrically conductive tip member, and first and second electrically conductive heat responsive means having substantially similar characteristics of thermal deflection and in heat conductive relationship to said first and second spaced apart portions, respectively, and each having a free end for mutual engagement only when the temperature difference between said first and second spaced apart portions exceeds a predetermined level, said difference resulting from a difference in rates of heat transfer of said heat conductive member and said tip member; and means for sensing when said heat responsive means are engaged including an electrical circuit having a source of electrical potential operatively connected to said heat responsive means and a current indicating means for indicating electrical current in the circuit when said heat responsive means are engaged, said electrical circuit further including a latching means for providing a steady electrical signal from said sensor device to said current indicating means.

2. The sensing apparatus according to claim 1 wherein said latching means for providing a steady electrical signal from said sensor device to said current indicating means comprises a switching means operatively connected to said source of electrical potential, said current indicating means, and said heat responsive means, said switching means adapted for closing upon the initial engagement of said free ends of said heat responsive means.

3. The sensing apparatus according to claim 2 wherein said switching means is electrically energized.

4. The sensing apparatus according to claim 3 wherein said electrically energized switching means is a reed switch.

5. The sensing apparatus according to claim 2 wherein said switching means is light actuated.

6. The sensing apparatus according to claim 5 wherein said light actuated switching means is a light actuated silicon controlled rectifier.

7. The sensing apparatus according to claim 2 wherein said switching means is heat actuated.

8. The sensing apparatus according to claim 7 wherein said heat actuated switching means comprises a bimetallic switch.

* * * * *